US007665982B2

(12) United States Patent
Lucier et al.

(10) Patent No.: US 7,665,982 B2
(45) Date of Patent: Feb. 23, 2010

(54) TWIN-SHEET THERMOFORMING PROCESS AND APPARATUS FOR INSERT INCLUSION

(75) Inventors: Normand Lucier, Laval (CA); Stéphane Poirier, Laval (CA)

(73) Assignee: Les Produits Plastitel Inc., Quebec (CA)

( * ) Notice: Subject to any disclaimer, the term of this patent is extended or adjusted under 35 U.S.C. 154(b) by 78 days.

(21) Appl. No.: 12/069,178

(22) Filed: Feb. 7, 2008

(65) Prior Publication Data

US 2008/0211128 A1  Sep. 4, 2008

(30) Foreign Application Priority Data

Feb. 7, 2007  (CA) .................................... 2578228

(51) Int. Cl.
*B29C 65/78* (2006.01)
(52) U.S. Cl. ..................... 425/508; 425/515; 425/519; 425/DIG. 48
(58) Field of Classification Search ................. 425/503, 425/504, 508, 509, 515, 519, DIG. 48
See application file for complete search history.

(56) References Cited

U.S. PATENT DOCUMENTS

| 3,250,660 | A | * | 5/1966 | Greig et al. | ........... 425/DIG. 48 |
| 3,398,434 | A |   | 8/1968 | Alesi, Jr. et al. | |
| 3,412,183 | A | * | 11/1968 | Anderson et al. | ............ 264/545 |
| 3,783,078 | A | * | 1/1974 | Brodhead | .................... 425/519 |
| 3,914,104 | A | * | 10/1975 | Dean et al. | ........... 425/DIG. 48 |
| 5,197,396 | A |   | 3/1993 | Breezer et al. | |
| 5,401,456 | A | * | 3/1995 | Alesi et al. | ................... 264/511 |
| 5,758,855 | A |   | 6/1998 | Jordan et al. | |
| 6,294,114 | B1 | * | 9/2001 | Muirhead | ................... 264/40.6 |
| 6,705,853 | B1 |   | 3/2004 | Nehring | |

* cited by examiner

*Primary Examiner*—Robert B Davis
(74) *Attorney, Agent, or Firm*—Muirhead and Saturnelli, LLC

(57) ABSTRACT

A twin-sheet thermoforming process and associated apparatus which enables placement of an insert between upper and lower sheets before the sheets are actually heated and formed is described herein. Since the insert is positioned before molding takes place, the insert does not cause the formed panels to rest and cool down before fusing is finally carried out to capture the insert and seal the panels to each other. Panel fusing may therefore be performed at an optimal temperature.

25 Claims, 11 Drawing Sheets

TWIN-SHEET THERMOFORMING PROCESS AND APPARATUS FOR INSERT INCLUSION

FIELD

The present invention generally relates to twin-sheet thermoforming processes and apparatuses and more specifically to processes and apparatuses permitting solid inserts to be included and adequately positioned between upper and lower webs.

BACKGROUND

It is generally known that thermoforming is a process that enables molding a heated and soften sheet of thermoplastic material by applying vacuum suction through a perforated mold. The suction makes the sheet adhere to the mold surface. The sheet is then cooled down with the possible assistance of blown cooling air, keeping the shape of the mould. Twin-sheet thermoforming generally refers to the molding of a first sheet in an upper mold and a second sheet in a lower mold, followed by an operation of compression of the two formed sheets against each other while still hot and relatively soft, thereby providing a fused interface to produce a hollow type product.

U.S. Pat. No. 3,398,434, issued to Alesi jr et al. on Aug. 27, 1968, and entitled "Vacuum Forming Apparatus" teaches a typical structure and process usable to carry out such a twin-sheet molding operation.

Although twin-sheet thermoforming has been successfully used for decades to manufacture hollow products such as gas tanks, pallets, water crafts, etc., it has been found desirable to further provide some products with inserts to improve the structure and/or certain properties of the product. An insert can be defined as a body that is not subjected to molding and which has to be inserted between the molded sheets and generally within a cavity created inside the thermoformed hollow product. For example, a metallic frame, tensile cables or a wooden core may be integrated inside a product to improve rigidity; a solid foam core may be integrated to provide sound proofing or thermal insulation. Hardware elements, fasteners and window glasses, for example, may also be integrated in the molded product to avoid subsequent assembly steps whenever possible. Although blow molding and rotomolding processes are currently used for the production of hollow parts, these processes do not allow inclusion of an insert during the molding process. In addition, injection molding of hollow parts with an insert require very complex and expensive tooling and therefore is not appropriate for large parts and/or low volume production of parts.

Accordingly, some solutions have been provided in the prior art to include insert placement during the thermoforming process. Although a traditional approach is to form upper and lower sheets separately, position the insert therebetween and thereafter assemble top and bottom parts with solvent, adhesive or fuse welding, an obvious gain of productivity can result from combining theses steps into a single operation, carried-out at a single molding station. However, existing solutions of that type are found in a very limited range of applications given their generally poor overall performance and high manufacturing cost, considering namely the high level of automation required.

In U.S. Pat. No. 6,705,853 entitled "Six Station Rotary Thermoforming Machine" granted to Nehring on Mar. 16, 2004, the disclosed machine comprises a top panel loading station, a lower panel loading station, two adjacent heating stations, a thermoforming station, an unloading station and a carousel for transferring thermoformable panels between the stations. The thermoforming station includes a pair of opposed, vertically translatable platens which receive respective molds which engage and form the panels and may include a robotic device for loading preformed cores or inserts. In spite of prohibitive cost and size for many facilities and applications, this machine still suffers from major limitations. Since it uses an external automated device to pick and place the insert once the panels have been formed, panel thickness shall be limited to a fairly low value given the very short cooling time of thick panels. The robot only has a few seconds to approach, position the insert, release it and return before the lower platen shall be raised to compress and fuse the formed panels together along their contact edges. This limits usable panel thicknesses, compromises panel interface welding quality and also limits insert structural and positioning complexity.

Similarly, U.S. Pat. No. 5,758,855 entitled "Pallet with Flexible Tensile Reinforcement and method for Making the Same" issued to Jordan et al. on Jun. 2, 1998 teaches a thermoformed reinforced pallet in which a reinforcing tensile member that can be in the form a mesh affixed between upper and lower decks of the pallet body. According to the disclosed method, first and second thermoplastic sheets are heated, then vacuum formed to form upper and lower decks, the reinforcing member is affixed to one of the formed sheets and pre-loaded, and the formed sheets are finally pressed against one another to provide a thermal bonding and capture the insert therebetween. In this method, sheets are heated and formed in sequence and a robot is used to transport and position the flexible tensile member or mesh on posts formed in the lower deck. Upper deck is then pressed down upon lower deck forming a plurality of knit points. Residual heat and pressure integrally fuse decks about their perimeter, posts and other discrete points, creating knit points and capturing the reinforcing insert. Obviously, the machine and process of Jordan et al. suffers from limitations similar to those of Nehring, discussed above.

In U.S. Pat. No. 5,197,396 entitled "Double Deck Plastic Pallet", and granted to Breezer et al. on Mar. 30, 1993, there is disclosed a plastic pallet having a twin sheet thermoformed upper deck reinforced with a tubular metal substrate, and a twin sheet thermoformed lower deck assembled to the upper deck. Although this patent is pointing out the benefits of providing a metallic substrate insert into the thermoplastic structure, between upper and lower sheets of the upper deck, it fails to teach an appropriate method to perform such a placement efficiently during the twin sheet thermoforming process.

SUMMARY

In accordance with a first aspect of the present invention, there is provided a twin-sheet thermoforming framing device comprising: an upper sheet mounting frame so configured as to releasably hold an upper thermoplastic sheet; a lower sheet mounting frame so configured as to releasably hold a lower thermoplastic sheet; and at least one insert holding assembly so configured as to hold at least one insert between the upper sheet mounting frame and the lower sheet mounting frame.

In accordance with a second aspect of the present invention, there is provided a thermoforming apparatus comprising: a thermoforming press station including first and second translatable molds; an oven station including heating elements; and a framing device comprising: an upper sheet mounting frame so configured as to releasably hold an upper thermoplastic sheet; a lower sheet mounting frame so configured as to releasably hold a lower thermoplastic sheet; and at least one insert holding assembly so configured as to hold at least one insert between the upper sheet mounting frame and the lower sheet mounting frame.

In accordance with a third aspect of the present invention, there is provided a twin-sheet thermoforming process comprising the steps of: providing upper and lower molds; providing a framing device; mounting upper and lower sheets of thermoplastic material to the framing device; mounting at least one insert to the framing device between the upper and lower sheets of thermoplastic material; heating the sheets of thermoplastic material; vacuum forming the upper and lower sheets of thermoplastic material respectively in the upper and lower molds to define upper and lower panels provided with respective edges; and moving the upper and lower molds towards each other to bring the respective edges of the upper and lower panels in contact, whereby the upper and lower panels are attached along their respective edges to form a hollow product and the at least one insert is captured in the hollow product between the upper and the lower panels.

Generally stated, illustrative embodiments of the present invention reduces the limitations, difficulties and disadvantages of the aforesaid machines and processes by providing a twin-sheet thermoforming process and associated apparatus which enables placement of an insert between upper and lower sheets before the sheets are actually heated and formed. Since the insert is positioned before molding takes place, the insert does not cause the formed panels to rest and cool down before fusing is finally carried out to capture the insert and seal the panels to each other. Panel fusing may therefore be performed at an optimal temperature, which ensures the adequate mechanical properties, in terms of resistance, fluid tightness, appearance, etc.

It has been found that a framing carriage may be provided, in which an insert can be pre-positioned, supported by retractable or sacrificial holding means, between the upper and lower sheets of thermoplastics at the time of sheet mounting. The carriage indexes between a sheet heating oven and a molding press on which the upper and lower molds are mounted, clearing the carriage circulation path. Heated sheets moving to the molding press station are formed while the insert remains suspended therebetween. Molds may thus be immediately moved towards each other until they meet, causing fuse welding of the molded panels and capturing the insert inside the formed cavity.

It will be appreciated that the illustrative embodiments of the present invention generally improves the quality of fused edges, reduces equipment size, complexity and cost, reduces the set-up time, and accelerates the cycle time for optimal productivity. It will also be appreciated that miscellaneous insert types can be contemplated regardless of sheet thickness to comply with a broad range of applications, and more particularly low volume applications that can not be carried out with known devices in a cost efficient manner.

In a broad sense, an illustrative aspect the present invention concerns a twin-sheet thermoforming process comprising the steps of: i) mounting at least one insert in a framing device between a first upper sheet and a second lower sheet of thermoplastic material, ii) simultaneously heating the sheets, iii) simultaneously vacuum forming the sheets in upper and lower molds to define upper and lower panels, iv) applying a pressure to urge the panels against each other, thereby fusing the panels along contacting edges to form a hollow product and capturing the at least one insert in the hollow product between the upper and the lower panels, and v) releasing the product from the molds.

In a further illustrative embodiment, mounting the at least one insert comprises providing at least one holder connecting the insert to the framing device. In an alternative illustrative embodiment, providing a holder comprises providing a retractable holder. In yet another illustrative alternative embodiment, providing a holder comprises providing a sacrificial holder.

The illustrative process discussed hereinabove may further comprise: vi) retracting the at least one holder to free the product. Alternatively, the illustrative process may further comprise vi) detaching the sacrificial holders from the framing device. The illustrative process may further comprise: vii) sectioning a portion of the sacrificial holders projecting from the product.

According to another illustrative aspect of the present invention, there is provided a thermoforming apparatus comprising a pair of opposed, translatable platens which receive respective molds, and a framing device comprising an upper sheet mounting frame, a lower sheet mounting frame and in between an insert mounting arrangement.

In a further illustrative embodiment or the apparatus, the framing device comprises a transfer carriage for transferring the framing device from a sheet heating station to a sheet forming station, the sheet heating station comprising a upper array of heating elements for heating the upper sheet and a lower array of heating elements for simultaneously heating the lower sheet.

According to another illustrative embodiment of the invention, the framing device further comprises at least one retractable carriage, the carriage being so configured as to carry at least one insert holder. The framing device may comprise two face-to-face retractable carriages for moving insert holders in opposite directions, each carriage carrying three insert holders.

According to an illustrative embodiment of the invention, the at least one insert holder comprises a needle. In an alternative illustrative embodiment, the insert holder comprises a tubular gaseous fluid injector.

In a still further alternative illustrative embodiment, the at least one insert holder comprises at least on pair of sacrificial tabs and the framing device further comprises tab engaging members to hold the tabs. Sacrificial tabs may be projecting from two lateral sides of an insert to hold it to the framing device through the tab engaging members. Sacrificial tabs may be made from a thermoplastic material.

Advantageously, the illustrative embodiments of the present invention provide a building block and connector system featuring stiff and tight interconnections between blocks in the axial and transversal directions of the courses, while providing vertical and horizontal passages within the erected structure. The block structure limits thermal conductivity, may be produced at low cost and is not likely to be affected by rough handling and adverse site conditions.

BRIEF DESCRIPTION OF THE DRAWINGS

Further aspects and advantages of the illustrative embodiments of the present invention will become better understood with reference to the description in association with the following figures. Note that similar numerals represent similar parts throughout figures.

FIG. 4b in an enlarged view of detail B of FIG. 4a;

DETAILED DESCRIPTION

Although the present invention will be described with reference to illustrative embodiments mainly configured for use in a simple two station apparatus configured for low production volume applications, persons skilled in the art will appreciate other applications wherein variations in the automation level may be desirable. For example, specific load and unload stations may be provided to speed up cycle time for higher volume applications, while carrying of the sheet supporting framing device may be accomplished manually between uncoupled oven and forming stations for very low volumes such as for testing or prototyping new products.

Figure 1:
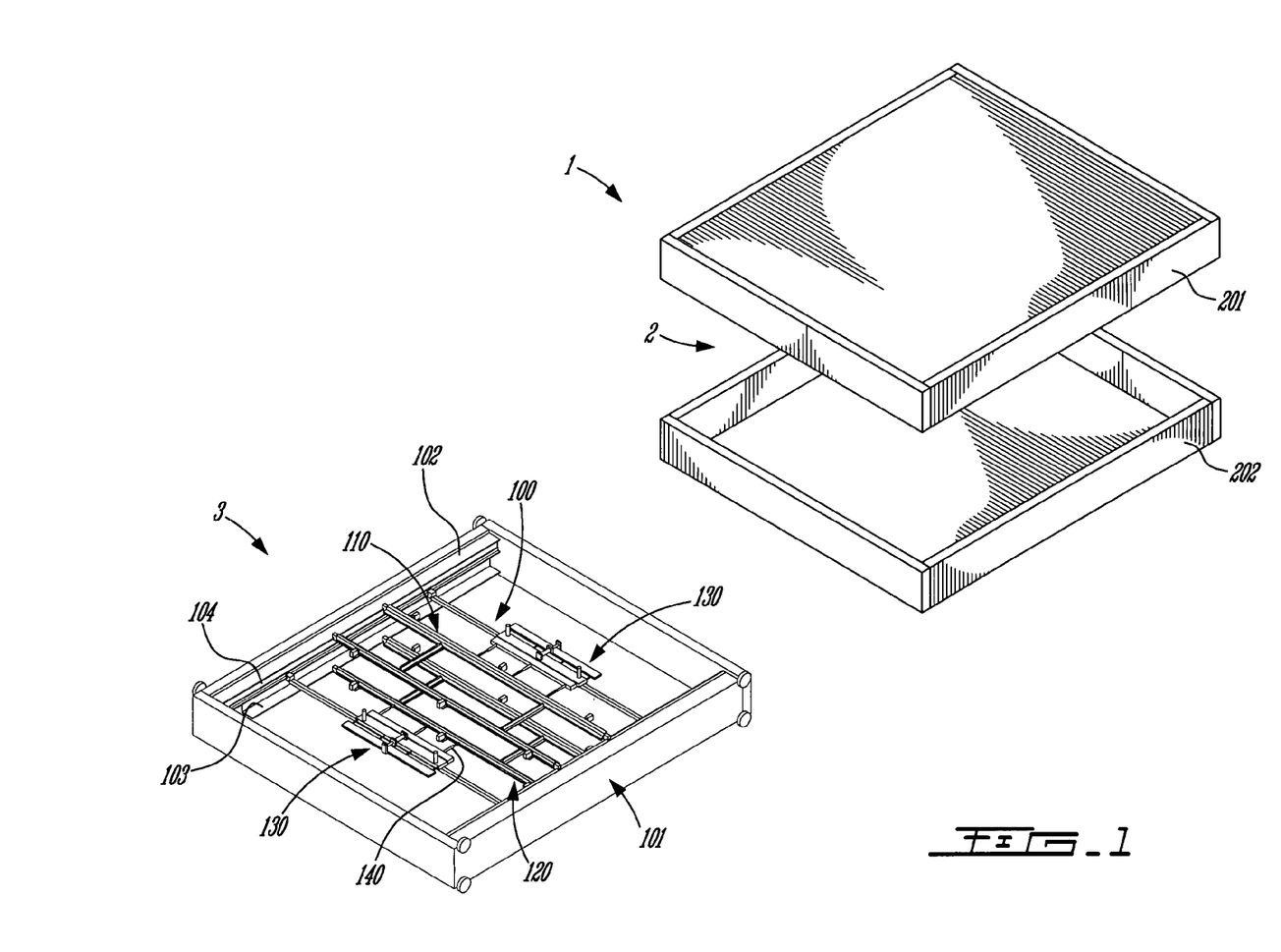
FIG. 1 is a perspective view of a two station thermoforming apparatus, according to an illustrative embodiment of the present invention.

FIG. 1 shows a partial general schematic representation of a two station thermoforming apparatus 1 according to an illustrative embodiment of the present invention. The illustrated apparatus comprises a sheet heating oven station 2 and a framing device 100 carried on a transfer carriage 101 for mobility between the sheet heating oven station 2 and a thermoforming station 3. The carriage 101 therefore comprises rollers riding on rails (not shown) to enable displacement of the carriage 101 between a position in vertical alignment with a twin platen thermoforming press at station 3 and a position in vertical alignment with the oven station 2. The oven station 2 comprises upper and lower arrays of heating elements 201 and 202, so aligned with respect to the rails to enable the carriage 101 to move and stop therebetween. The transfer carriage 101 may be supplied by flexible pressurized air lines and/or electrical power lines (not shown) and can be moved back and forth between stations 2 and 3 by actuators (not shown) such as air cylinders powered through solenoid valves (not shown) and a system controller (not shown). Conventionally, the loading of thermoplastic sheets and unloading of molded products is carried out at the molding station 3. Except for the framing device 100, such an apparatus 1 is typical and well known to those skilled in the art of thermoforming.

Figure 2:
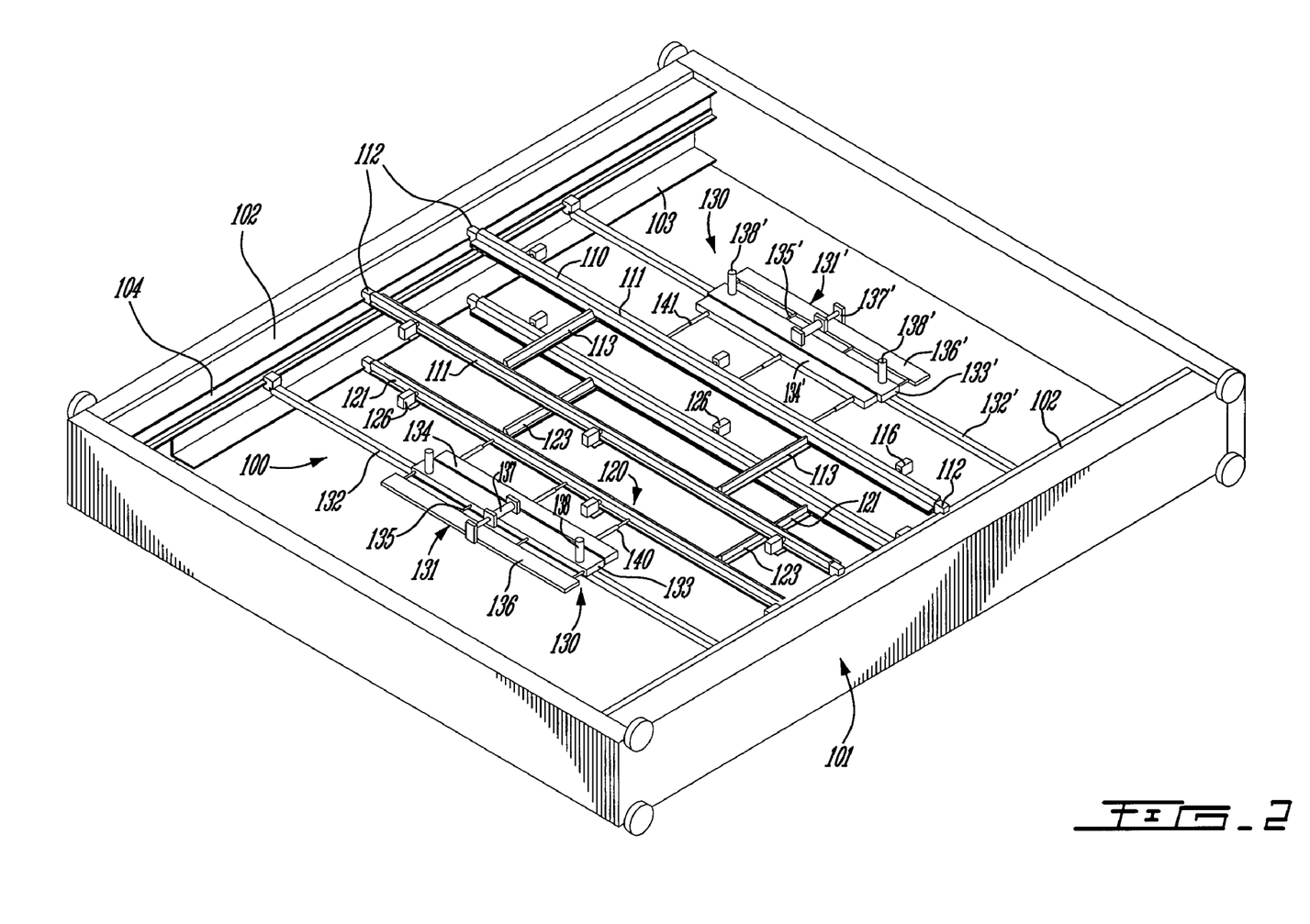
FIG. 2 is a perspective view of the framing carriage of the two station thermoforming apparatus of FIG. 1.
Figure 3:
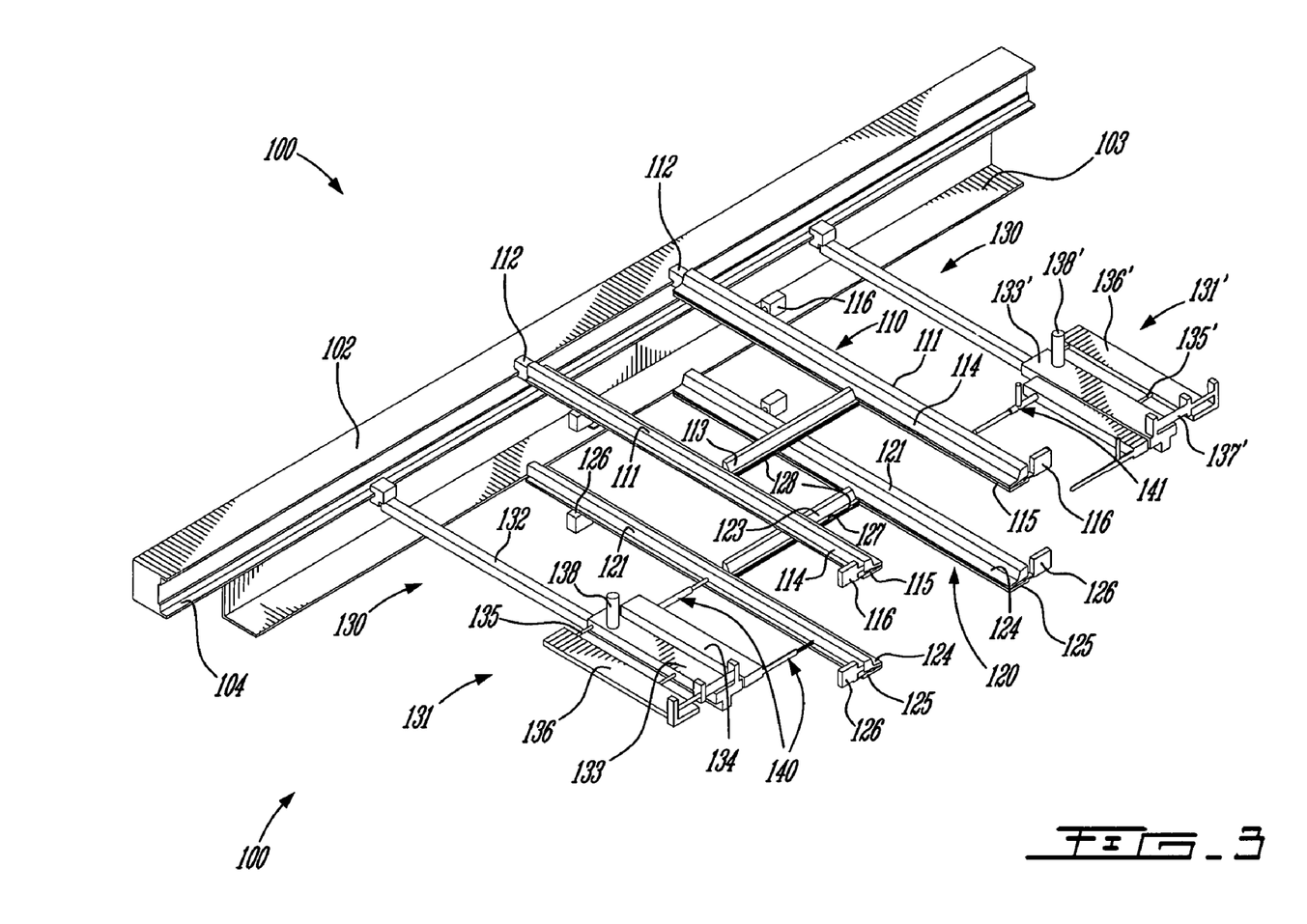
FIG. 3 is an enlarged partial perspective view of the framing carriage of FIG. 2.

Referring now more specifically to FIGS. 2 and 3, the framing device 100 will now be described in detail. The framing device 100, preferably mounted on a transfer carriage 101 as described above, further comprises an upper sheet conformable mounting frame 110, a lower sheet conformable mounting frame 120 and two insert holding assemblies 130 provided at the front end and at the back end of the framing device 100.

The upper sheet mounting frame 110 comprises a pair of transversal clamping bars 111, provided with C skates 112 at both ends, sliding and lockable on lateral longitudinal tracks 102 of the transfer carriage 101, and two adjustable connecting clamping bars 113 extending between and connected to the transversal clamping bars 111 to form a rectangular frame of an appropriate size to conform to and support the peripheral edge of an upper sheet to be formed.

As can be better seen from FIG. 3, each clamping bar 111 comprises a continuous top plate 114 pivotally assembled to a continuous base plate 115 about a pivot axis (not shown). The continuous top plate 114 is connected to actuating air cylinders 116. Accordingly, the top and bottom plates 114 and 115 form an integral clamp usable to firmly hold an edge of the thin sheet during the forming process and release the hollow molded product at the end of the process cycle.

Each connecting clamping bars 113 is similarly constructed with C skates lockable on base plate 115 of bar 111, top plate 117, base plate 118 and air cylinders (not shown) to clamp another edge of the thin sheet, which can also be released at the end of the process cycle.

Symmetrically, the lower sheet mounting frame 120 comprises a pair of transversal clamping bars 121 including with top plates 124, base plates 125, and cylinders 126. The clamping bars 121 are provided with C skates 122 sliding and lockable on a lower set of lateral tracks 103. The clamping frame 20 is also provided with connecting clamping bars 123 including top plates 127, base plates 128 and cylinders (not shown).

The upper and lower sheet mounting frames 110 and 120 may therefore releasably retain thin thermoformable sheets in adequate position.

The framing device 100 includes two insert holding assemblies 130. For concision purpose, only one assembly 130 will be described hereinbelow. The same reference numerals provided with a prime symbol are used for the other assembly 130. The insert holding assembly 130 comprises a front retractable carriage 131 mounted on a lockable transversal sliding bar 132 riding on longitudinal rails 104. The carriage 131 includes a fixed portion 133 assembled to the sliding bar 132 and a reciprocating portion 134 slidably assembled to the fixed portion 133 through rods 135 that are connected to a back stop plate 136. The reciprocating movement of the reciprocating portion 134 is actuated by air cylinder 137 mounted between the fixed portion 133 and the back stop plate 136 and controlled by the system controller (not shown). The fixed portion 133 may further comprise sacrificial holder engaging members in the form of posts such as 138 so configured as to engage sacrificial holders as will be described further in the description.

The reciprocating portion 134 is provided with insert holders 140 in the form of needles so configured as to penetrate in an insert such as a foam core. On the other hand, the reciprocating portion 134' is shown provided with tubular insert holders 141 to be used as fluid injectors, best viewed from FIG. 4a to 4c. Therefore, retractable carriages 131 and 131' are so configured as to move the two sets of insert holders 140, 141 toward each other or away from each other as directed by the controller. This enables a forward mode to penetrate and support an insert, and a backward mode to free the insert. Obviously, combinations of holder types and quantities may be used depending on the type and size of insert or to hold a plurality of independent inserts.

While the use of the basic needle holder 140 will easily be understood by one skilled in the art, injector holders 141 perform tasks that will now be described along with a detailed description of the structure of injector holder 141 referring to FIGS. 4a to 4c.

Figure 4A:
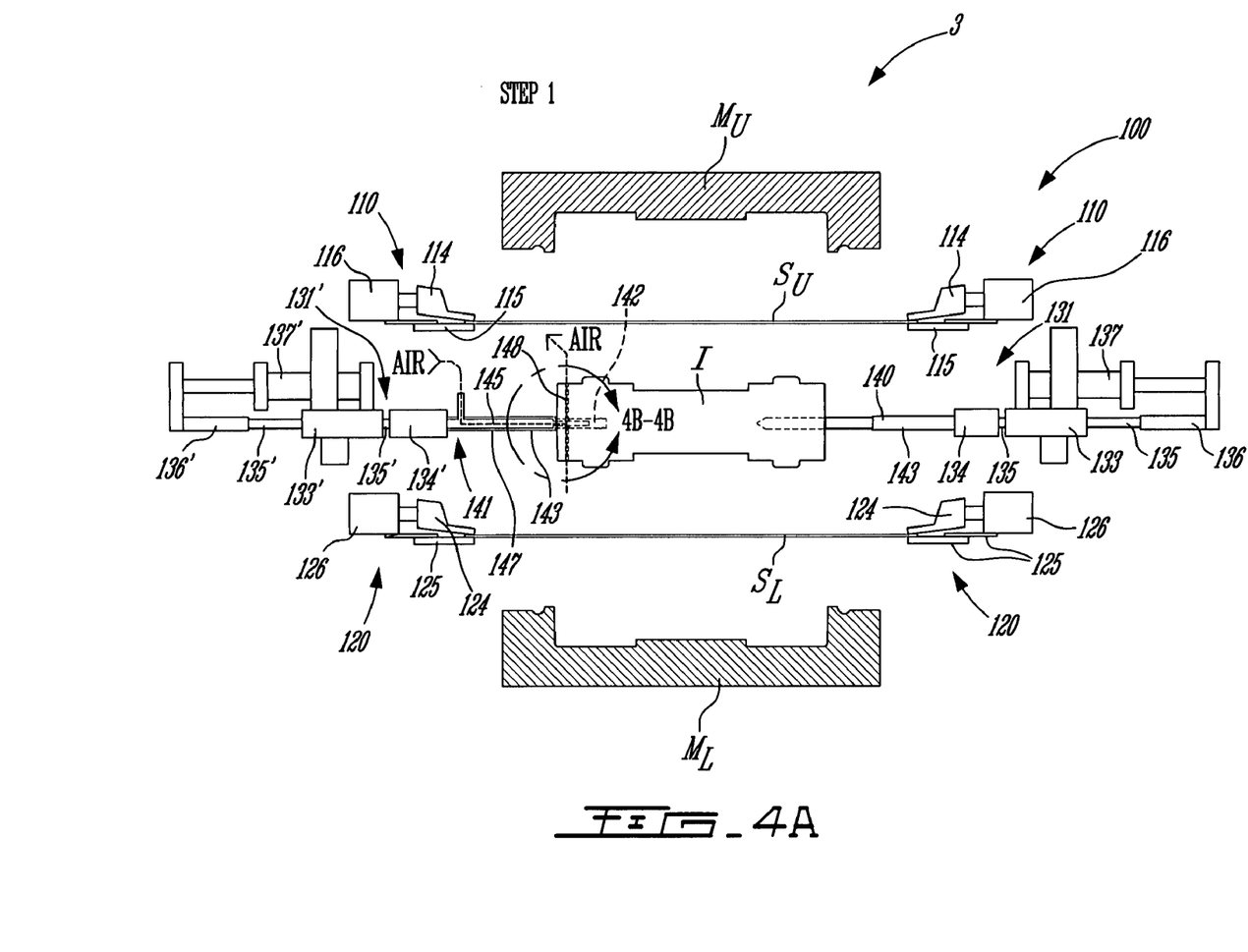
FIG. 4a is a schematic side elevational view of an apparatus according to an illustrative embodiment of the present invention, shown after a first step of a thermoforming process.
Figure 4B:
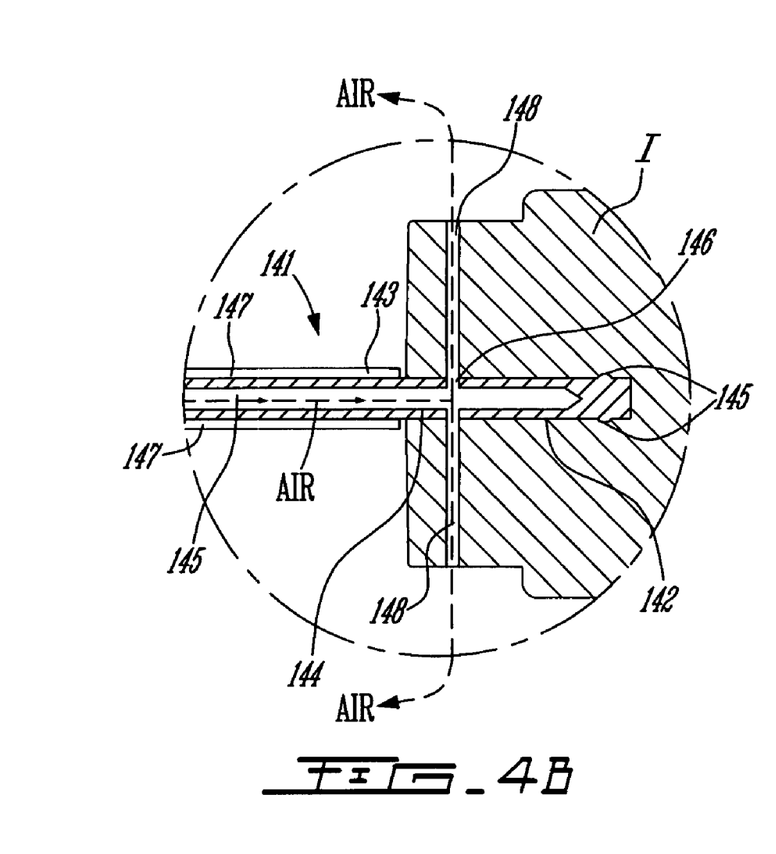
Figure 4C:
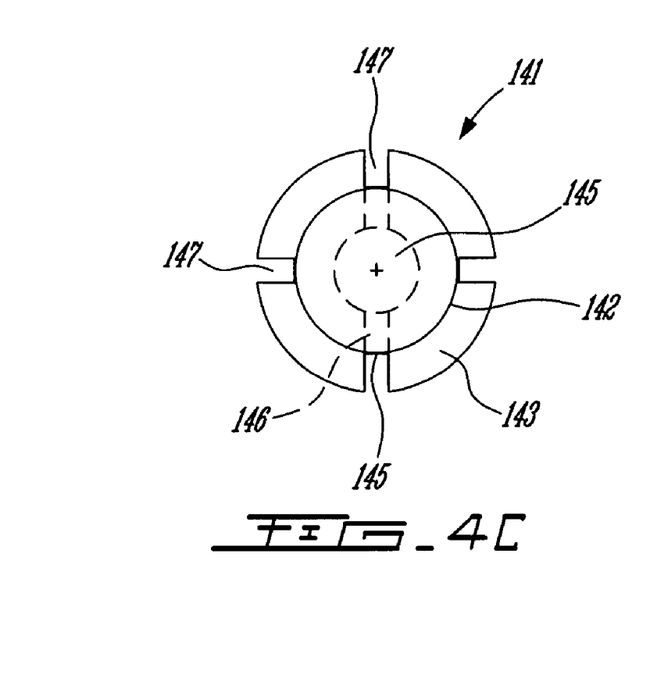
FIG. 4c is an enlarged cross-sectional view taken along line C-C of FIG. 4b.

FIG. 4a shows a schematic side elevational view of the framing device 100 positioned between upper and lower twin-sheet thermoforming molds $M_U$ and $M_L$. An upper thermoplastic sheet $S_U$ and a lower sheet $S_L$ have been mounted in the clamping bars of the upper and lower mounting frames 110 and 120 respectively. In addition, an insert I has been mounted between holders 140 and 141, between sheets $S_U$ and $S_L$ and in a pre-determined position in vertical alignment with molds $M_U$ and $M_L$. This framing operation constitutes the first step of the thermoforming process.

It can be seen that tubular injector holder 141 (see also enlargements in FIGS. 4b and 4c) has an elongated needle 142 extending from a larger diameter shank 143 defining a shoulder 144. Protrusions or spring loaded balls 145 are provided near the tip of the needle 142 to help holding the insert I on the needle 142. Should the insert I be made of hard material, a pre-drilled bore should be provided in this insert I to allow insertion of the needle 142 which is firmly retained in the same insert I thanks to the spring-loaded balls 145. A centre bore 145 is provided from the end of the shank to radial exit holes 146 and can be connected to a pressurized air source (not shown) to feed fresh air through the radial exit holes 146.

The purpose of injector 141 is two-fold. Firstly, it enables pressurized cooling air to be injected in cavities formed by the molding between the insert I and the molded and fused panels to accelerate cooling of the product prior to the unloading step. Secondly, air trapped in the cavities after the upper and lower panels have been fused together is heated by the still hot panels and tends to expand, which creates internal pressure that would cause inflation and distortions in the product during cooling. Therefore, the injector 141 is further provided with axial peripheral grooves 147 on the shank portion 143 to provide an exit at peripheral edges for air entrapped between fused panels, thus preventing pressure to rise in the cavities to ensure close dimensional conformity of the finished product. Obviously, should holes 146 fall inside insert I, optional channels such as 148 shall be provided in the insert to allow air to escape from holes 146 and reach cavities.

Alternatively, a chamfer (not shown) can be provided about the inlet of holding bores in insert I to prevent holes 146 from being blinded by contact with the insert material I. It is worth mentioning also that fresh air circulation thus provided in molded cavities and around insert I further helps keeping the insert cool thus preventing it from being melted or deformed.

Now, referring to FIGS. 4 to 8, a twin-sheet thermoforming process with insert inclusion and placement according to an illustrative aspect of the present invention will be described.

As stated above, step one consists in the sheets and insert pre-positioning as illustrated in FIG. 4a. This is made possible by the framing device 100. In this step, the framing device 100 is positioned at forming station 3 in proper alignment with molds $M_U$ and $M_L$ mounted on the upper and lower platens of the forming press.

Figure 5:
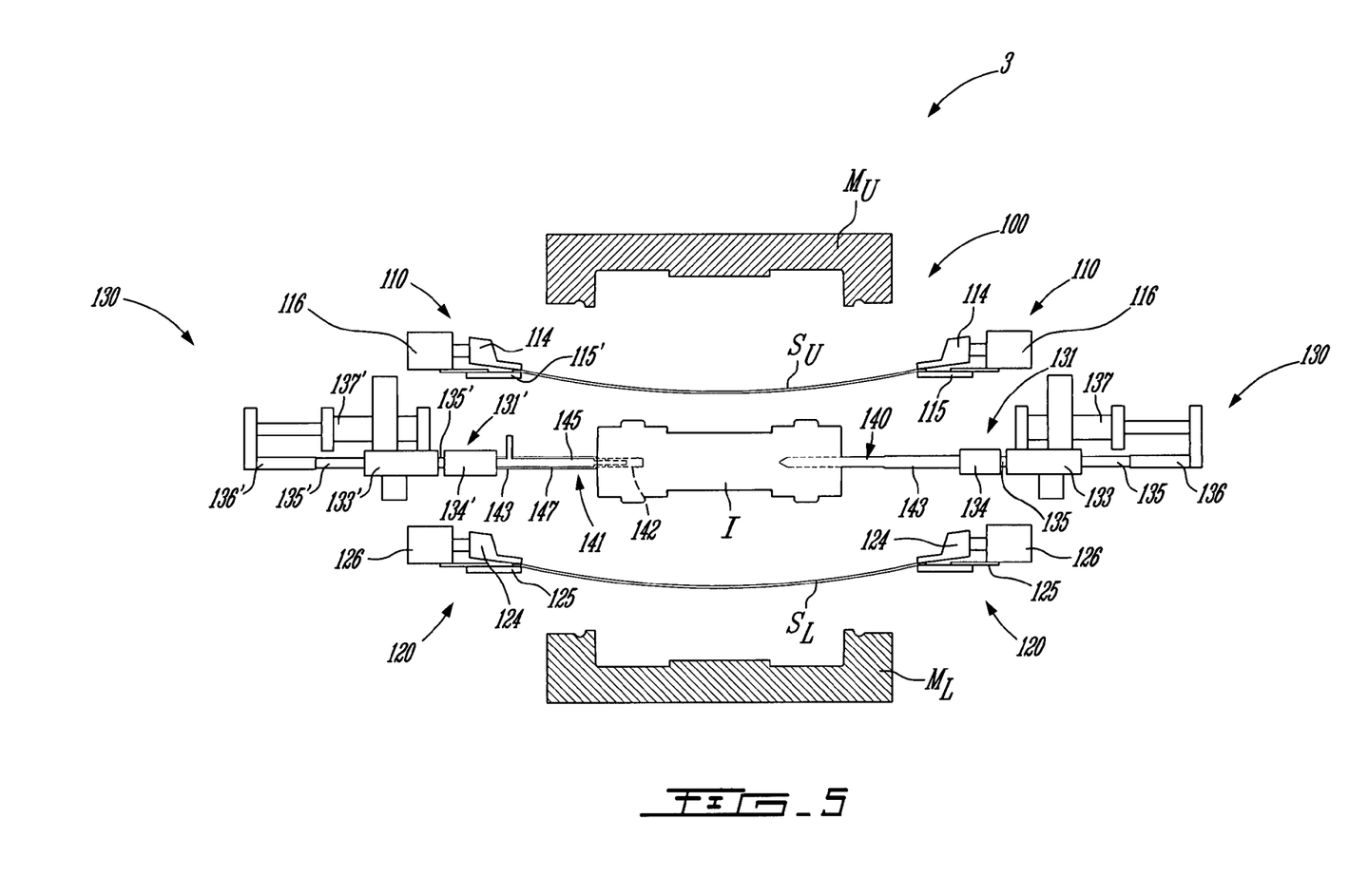
FIG. 5 is a schematic side elevational view of the apparatus of FIG. 4, shown after a second step of a thermoforming process.

Turning now to FIG. 5, the second step consists in heating and softening the sheets $S_U$ and $S_L$ by moving carriage 101 to the oven station 2 between heating upper and lower arrays 201 and 202 (see FIG. 1) for a pre-determined period of time. Carriage 101 is then moved back to the molding station 3 ready for the forming operation as shown in FIG. 5. Alternatively, the framing device 100 could be moved manually to and from the oven station 2. Insert I is not likely to be affected by this heating operation.

Figure 6:
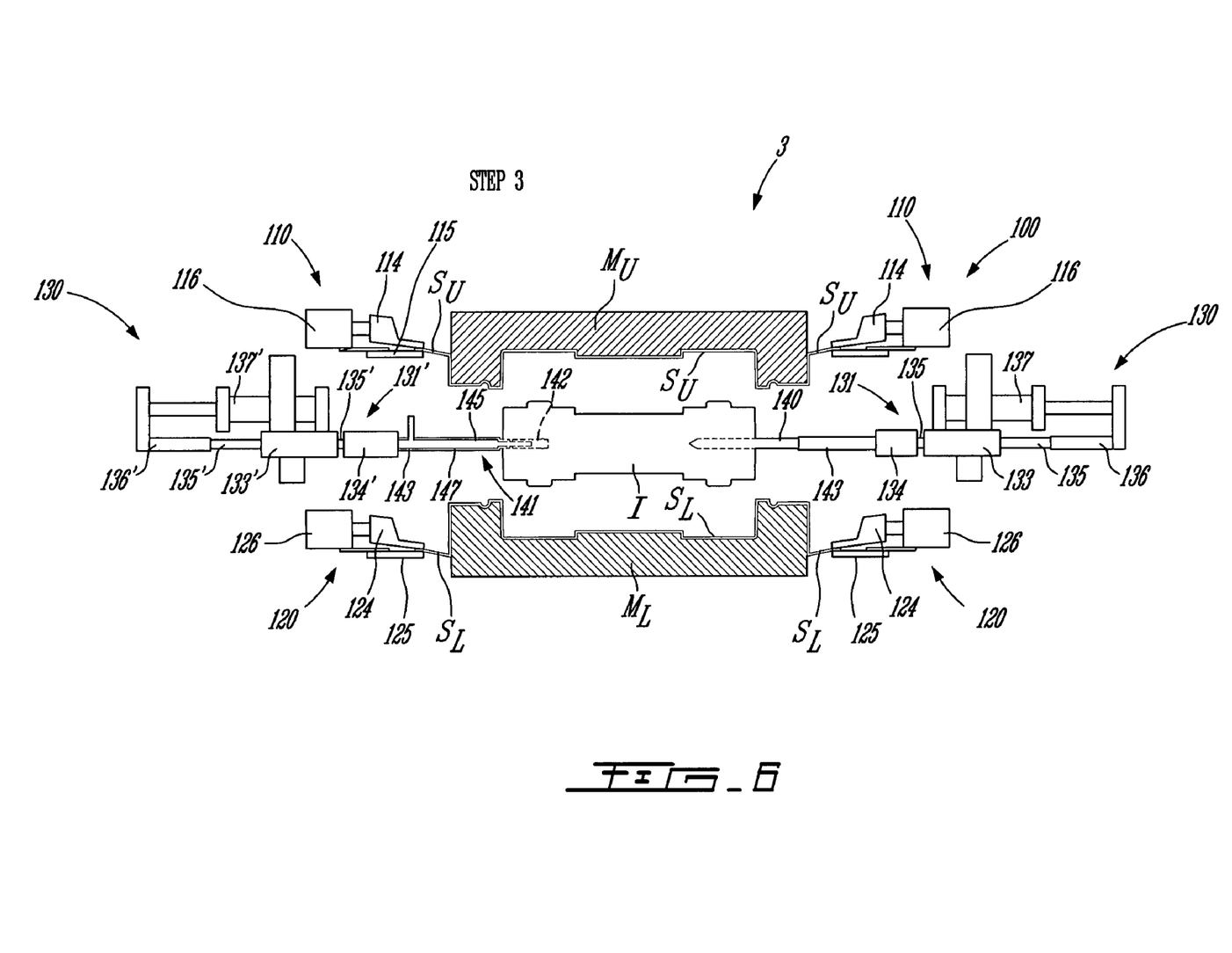
FIG. 6 is a schematic side elevational view of the apparatus of FIG. 4, shown after a third step of a thermoforming process.

FIG. 6 illustrates the third step, wherein the sheets $S_U$ and $S_L$ are vacuum formed on molds $M_U$ and $M_L$. As in a conventional twin-sheet forming process, the molds are vertically displaced to engage with the hot and soften sheets, then vacuum suction is applied to suck and form each sheet in its respective mold to define upper and lower panels $P_H$ and $P_L$. Insert I still remains in its original position.

Figure 7:
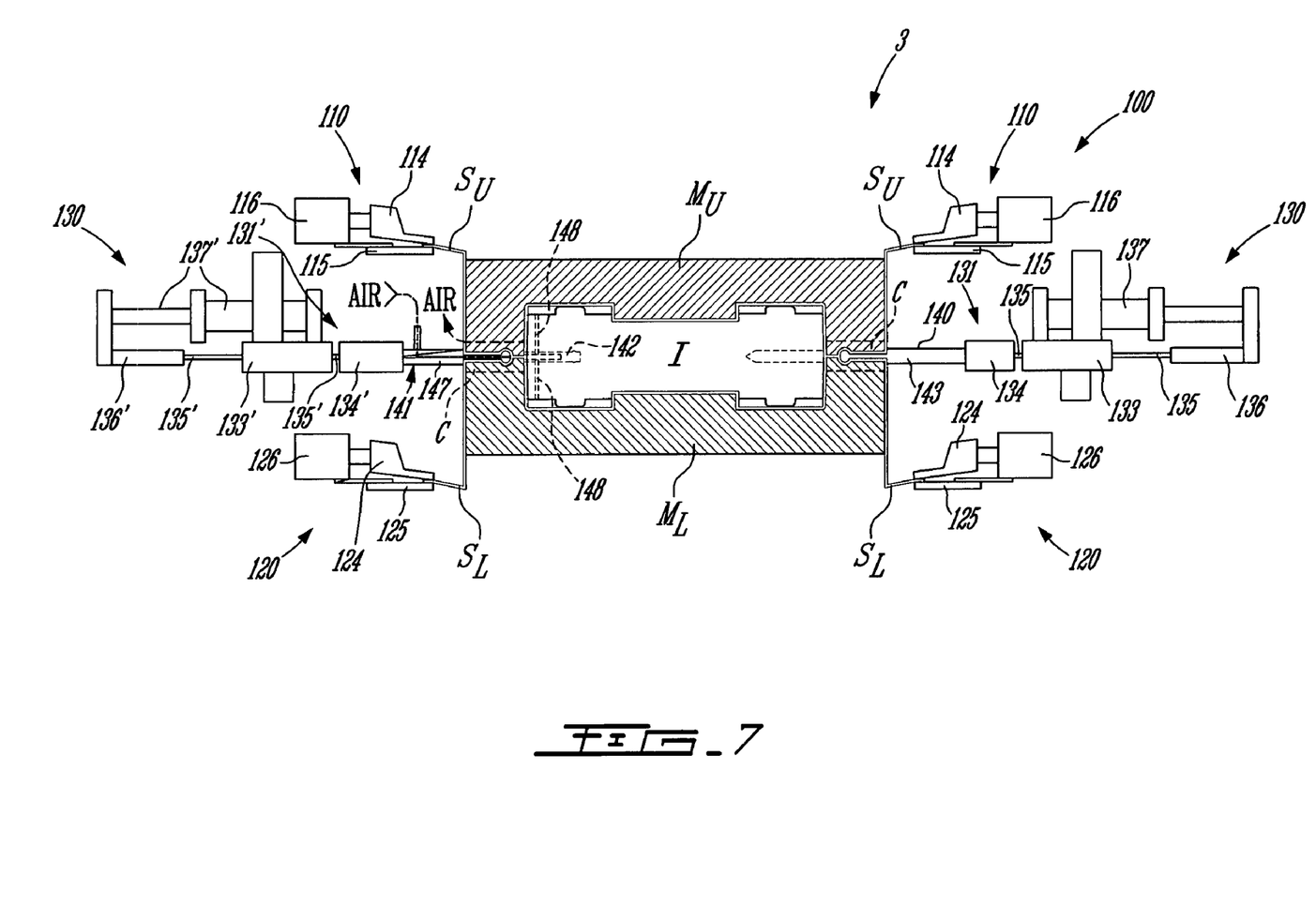
FIG. 7 is a schematic side elevational view of the apparatus of FIG. 4, shown after a fourth step of a thermoforming process.

In the fourth step illustrated in FIG. 7, fuse welding of the peripheral edges can be carried-out without delay. The moulds $M_U$ and $M_L$ are further moved toward each other until the still hot peripheral edges of panels $P_H$ and $P_L$ make contact. Then the platen driving screws of the press (not shown) are locked and the lower platen (not shown) is pushed upwardly, for example by pressurized air bags (not shown) urging lower mold $M_L$ towards upper mold $M_U$. The panel contact edges are therefore subjected to an appropriate compression force to yield fusion of panels $P_H$ and $P_L$ together along the edges to form a hollow product including the insert I inside.

It should be noted that complementary semi-circular cylindrical horizontal channels C, slightly larger than the shank diameter of holders 140, 141, are appropriately provided to prevent the crushing of the holders. At this step, fresh air may be advantageously injected using injector holders 141 as described above. Horizontal channels C may further serve to let air exit from cavities through panel edges along grooves 147.

Figure 8:
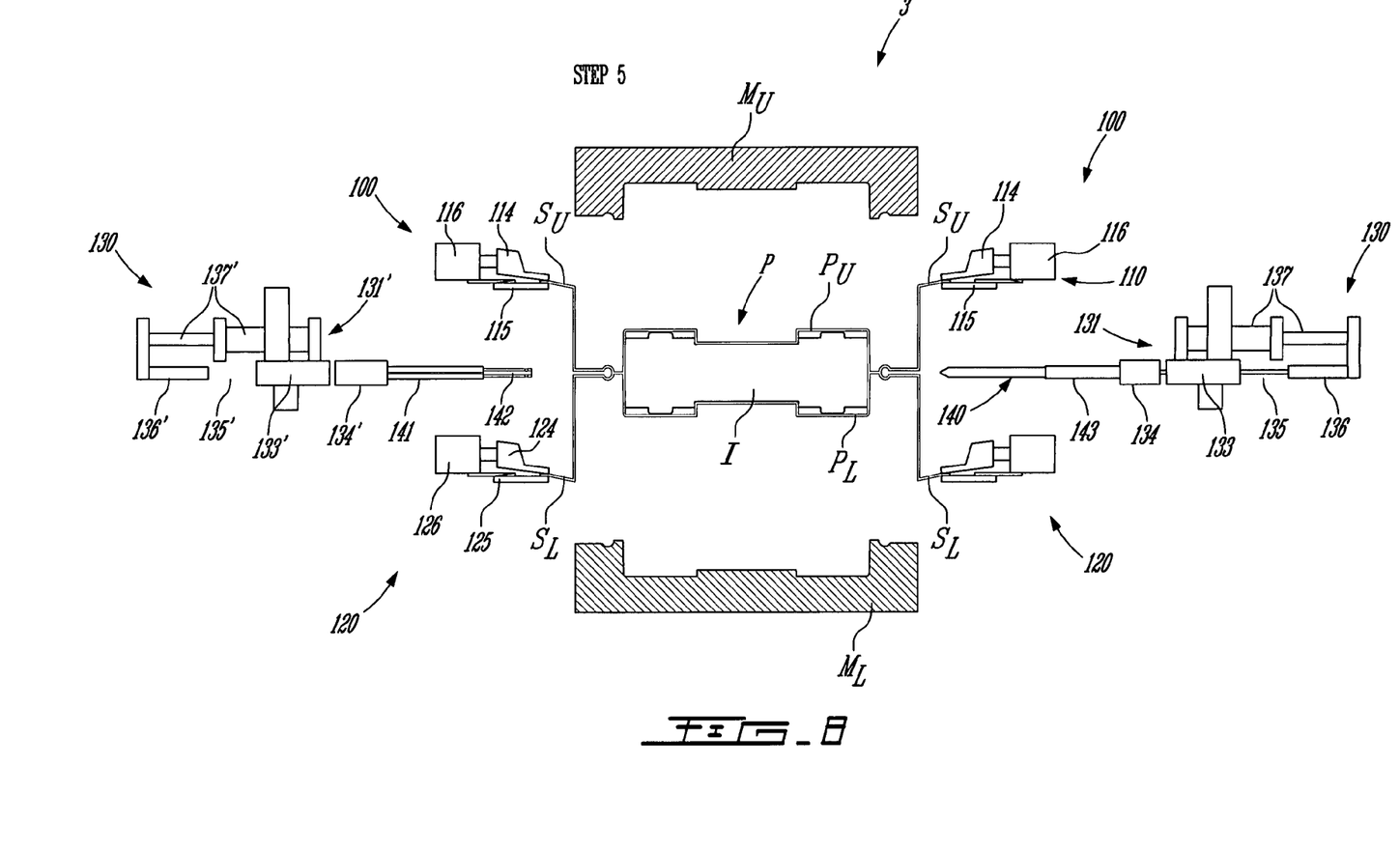
FIG. 8 is a schematic side elevational view of the apparatus of FIG. 4, shown after a fifth step of a thermoforming process.

Finally, as illustrated in FIG. 8, press platen driving screws (not shown) are unlocked and actuated to move platens and associated molds away from each other. Insert holders 140 and 141 may then be retracted at any appropriate time, leaving the molded product P hang by the clamping bars of the mounting frames 110 and 120. The small diameter stigma bores from horizontal channels C remain present at the peripheral edge after retrieving holders 140, 141, and can be plugged after trimming of the peripheral edges to yield a final product.

It is to be noted that while the illustrated insert I takes up the main portion of the internal cavity of the molded product P, significantly smaller Inserts (not shown) could be positioned and left inside a molded product.

It is also to be noted that while two holding assemblies 130 are used in the above described illustrative example, the number of holding assemblies and the type of holder contacting the insert can vary. Furthermore, while two different holders 140 and 141 are used in the example described hereinabove, two identical holders 140 or 141 could be used.

Figure 9:
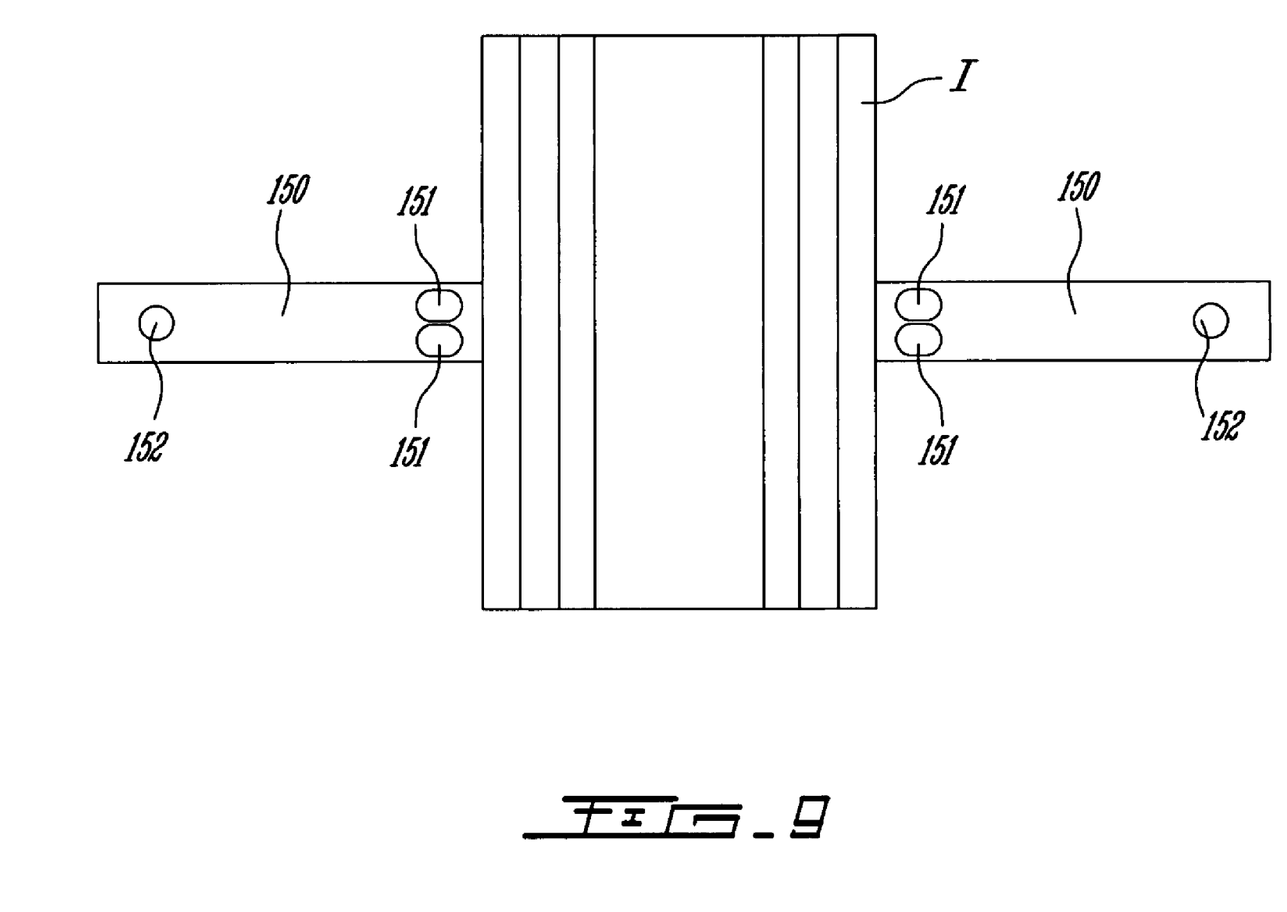
FIG. 9 is top plan view of an insert provided with sacrificial tab holders.
Figure 10:
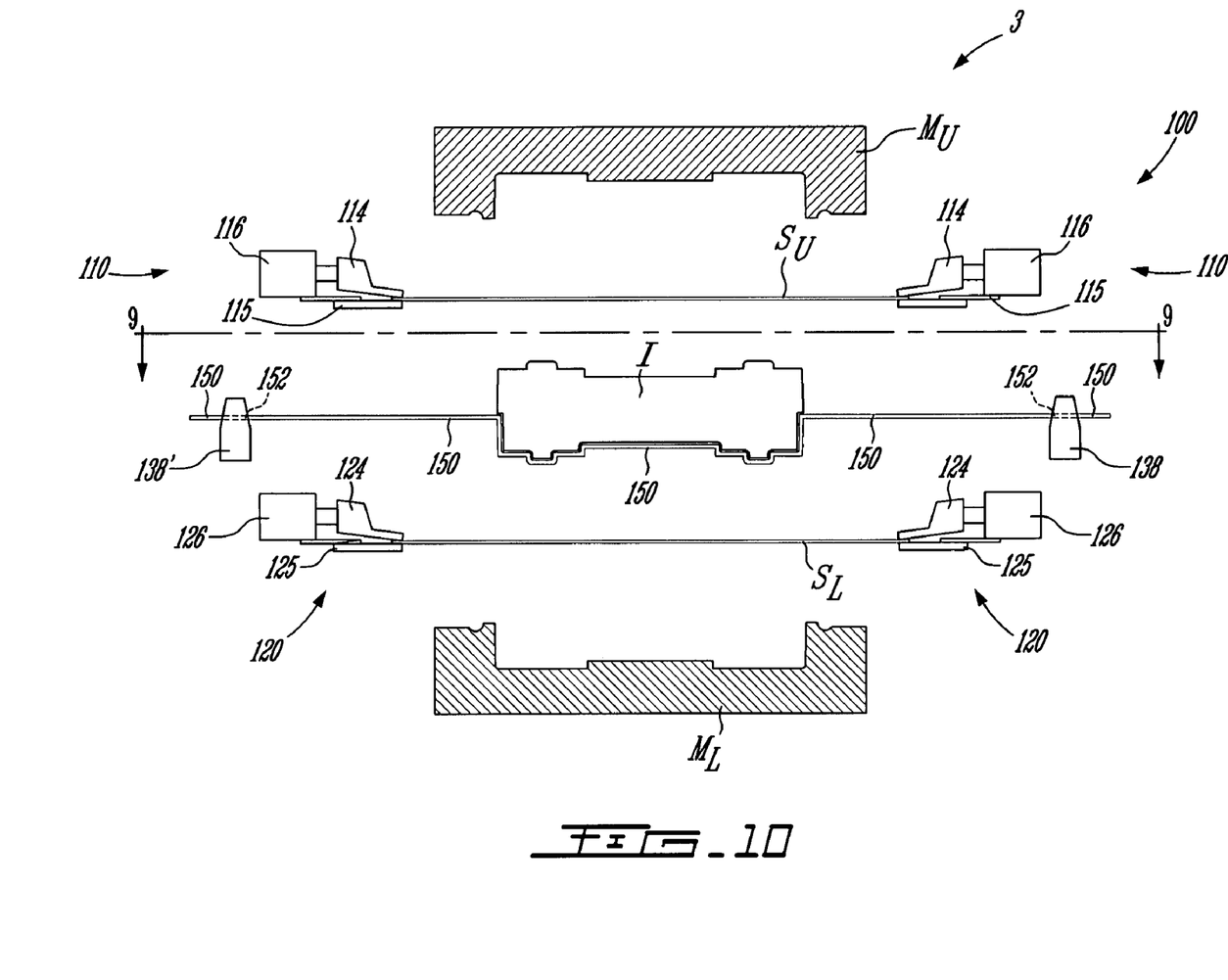
FIG. 10 is a schematic side elevational view of the apparatus of FIG. 4 shown after a first step of an alternate embodiment of the thermoforming process pursuant to an aspect of the invention.

Turning now to FIGS. 9 and 10 of the appended drawings, an alternative holder will be described. Indeed, the insert I may be held in position using sacrificial holders 150, instead of, or complementarily with, reusable retractable holders such as 140 and 141.

In such a case, the insert I is prepared with strips of material attached to it or integral to it to constitute sacrificial holders 150 as seen in FIG. 9. The sacrificial holders 150 are provided with perforations 151 where edge fusing will occur to minimize interference between the panel edges and the holders 150. Holes 152 are provided for engagement with the tips of tapering posts 138 (see also FIG. 3) whereby the insert I is supported by sacrificial holders 150.

Therefore, in the first step of the thermoforming process, as shown in FIG. 10, upper and lower sheets $S_U$ and $S_L$ are mounted in the aforementioned manner, but the insert I is held in position using holders 150 and posts 138, 138'. Sacrificial holders may be made from any suitable material but may be advantageously made from a thermoplastic material to enable fusion with panel edges, leaving virtually invisible stigma at the product peripheral edges. Alternatively, a material which is not subject to fusion through the thermoforming process can be used which would require trimming along with the product peripheral edges and might leave some small visible vestiges from the trimmed edges of sacrificial holder 150.

Again, it is to be noted that while only two holding assemblies 130 are used in the above described illustrative example, the number of holding assemblies can vary.

It will be noted that while the apparatus described hereinabove is generally horizontally provided, other orientations are possible.

One can thus appreciate from the foregoing description, that the twin-sheet thermoforming process and apparatus of the present invention advantageously provide solid insert inclusion to improve product properties, yet at affordable cost for short product runs, with simple and lean equipment. Pre-placement of inserts eliminates delays between forming and fusing which ensures uncompromised quality of fused edges. Modularity of the framing device enables quick changes between jobs dealing with products of different sizes and inserts of different nature.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention as defined in the appended claims. For example, other types of insert holding means may be contemplated, as long as they can removably support an insert between upper and lower sheets until fusion of the panel edges with minimal interference with the periphery of the molded product.

What is claimed is:

1. A thermoforming apparatus comprising:
   a thermoforming press station including first and second translatable molds;
   an oven station including heating elements; and
   a framing device comprising:
      an upper sheet mounting frame so configured as to releasably hold an upper thermoplastic sheet;
      a lower sheet mounting frame so configured as to releasably hold a lower thermoplastic sheet; and
      at least one insert holding assembly so configured as to hold at least one insert between the upper sheet mounting frame and the lower sheet mounting frame.

2. The thermoforming apparatus of claim 1, further comprising a transfer carriage for transferring the framing device from the oven station to the thermoforming press station.

3. The thermoforming apparatus of claim 1, wherein the oven station includes a upper array of heating elements for heating the upper thermoplastic sheet and a lower array of heating elements for heating the lower thermoplastic sheet.

4. The thermoforming apparatus of claim 3, wherein the oven station simultaneously heats the upper and lower thermoplastic sheets.

5. The thermoforming apparatus of claim 1, wherein the framing device includes lateral longitudinal tracks to which the upper and lower sheet mounting frames are slidably mounted.

6. The thermoforming apparatus of claim 5, wherein the upper and lower sheet mounting frames respectively include:
   first and second adjustable transversal clamping bars slidably mounted to the lateral longitudinal tracks; and
   first and second connecting clamping bars extending between and connected to the first and second transversal clamping bars;
   whereby, the transversal and connecting clamping bars define a generally rectangular frame of an appropriate size to conform to and support the peripheral edge of a thermoplastic sheet to be formed.

7. The thermoforming apparatus of claim 1, wherein the at least one insert holding assembly is so mounted to the framing device as to be movable.

8. The thermoforming apparatus of claim 1, wherein the at least one insert holding assembly includes a fixed portion and a reciprocating portion; the
   reciprocating portion including at least one insert holder so configured as to contact the at least one insert.

9. The thermoforming apparatus of claim 8, wherein the at least one insert holder includes a needle.

10. The thermoforming apparatus of claim 8, wherein the at least one insert holder includes a tubular injector.

11. The thermoforming apparatus of claim 10, wherein the tubular injector includes an elongated hollow needle extending from a larger diameter shank defining a shoulder; the elongated hollow needle including at least one spring loaded ball provided near the tip thereof; the elongated hollow needle including radial exit apertures and is so configured as to be connected to a pressurized air source to feed fresh air through the radial exit apertures.

12. The thermoforming apparatus of claim 1, wherein the at least one insert holding assembly comprises a structure for retaining a sacrificial holder.

13. The thermoforming apparatus of claim 12, wherein the sacrificial holder includes opposite tabs mounted to the framing device.

14. The thermoforming apparatus of claim 12, wherein the sacrificial holder is made of thermoplastic material.

15. A twin-sheet thermoforming framing device comprising:
   an upper sheet mounting frame so configured as to releasably hold an upper thermoplastic sheet;
   a lower sheet mounting frame so configured as to releasably hold a lower thermoplastic sheet; and
   at least one insert holding assembly so configured as to hold at least one insert between the upper sheet mounting frame and the lower sheet mounting frame.

16. The twin-sheet thermoforming framing device of claim 15, comprising lateral longitudinal tracks to which the upper and lower sheet mounting frames are slidably mounted.

17. The twin-sheet thermoforming framing device of claim 16, wherein the upper and lower sheet mounting frames respectively include:
   first and second adjustable transversal clamping bars slidably mounted to the lateral longitudinal tracks; and
   first and second connecting clamping bars extending between and connected to the first and second transversal clamping bars;
   whereby, the transversal and connecting clamping bars define a generally rectangular frame of an appropriate size to conform to and support the peripheral edge of a thermoplastic sheet to be formed.

18. The twin-sheet thermoforming framing device of claim 15, wherein the at least one insert holding assembly is so mounted to the framing device as to be movable.

19. The twin-sheet thermoforming framing device of claim 15, wherein the at least one insert holding assembly includes a fixed portion and a reciprocating portion; the reciprocating portion including at least one insert holder so configured as to contact the at least one insert.

20. The twin-sheet thermoforming framing device of claim 19, wherein the at least one insert holder includes a needle.

21. The twin-sheet thermoforming framing device of claim 19, wherein the at least one insert holder includes a tubular injector.

22. The twin-sheet thermoforming framing device of claim 21, wherein the tubular injector includes an elongated hollow needle extending from a larger diameter shank defining a shoulder; the elongated hollow needle including at least one spring loaded ball provided near the tip thereof; the elongated hollow needle including radial exit apertures and is so configured as to be connected to a pressurized air source to feed fresh air through the radial exit apertures.

23. The twin-sheet thermoforming framing device of claim 15, wherein the at least one insert holding assembly comprises a structure for retaining a sacrificial holder.

24. The twin-sheet thermoforming framing device of claim 23, wherein the sacrificial holder includes opposite tabs mounted to the framing device.

25. The twin-sheet thermoforming framing device of claim 23, wherein the sacrificial holder is made of thermoplastic material.

* * * * *